United States Patent [19]

Rieche et al.

[11] Patent Number: 5,056,901
[45] Date of Patent: Oct. 15, 1991

[54] WIDE-ANGLE OBJECTIVE

[75] Inventors: Gerd Rieche, Jena; Gerhard Risch, Weimar, both of German Democratic Rep.

[73] Assignee: Jenoptik Jena G.m.b.H., Jena, Fed. Rep. of Germany

[21] Appl. No.: 479,324

[22] Filed: Feb. 13, 1990

[30] Foreign Application Priority Data

Apr. 3, 1989 [DD] German Democratic Rep. .................................... 3272015

[51] Int. Cl.$^5$ ............................................. G02B 11/34
[52] U.S. Cl. ..................................... 359/737; 359/754
[58] Field of Search ........ 350/432, 447, 463, 442–443, 350/449–450, 464–465; 501/44

[56] References Cited

U.S. PATENT DOCUMENTS 4,013,349  3/1977  Bertele ................................. 350/463
4,386,163  5/1983  Kodama ................................ 501/44

Primary Examiner—Bruce Y. Arnold
Assistant Examiner—James Phan
Attorney, Agent, or Firm—Jordan and Hamburg

[57] ABSTRACT

A wide-angle objective for a picture-taking lens of an aerial mapping camera, consisting of 11 lenses and 14 glass-air surfaces, the first optical element of which after the center aperture on the picture side is a converging fluorspar or fluorspar-like lens. Due to the large refractive index difference between this lens and the following meniscus lens and due to the provision of a triple group of high refractive index on the object side before the center aperture, a high resolution, low residual distortion and minimal lateral chromatic aberration are achieved.

1 Claim, 2 Drawing Sheets

WIDE-ANGLE OBJECTIVE

BACKGROUND OF THE INVENTION

The invention relates to a picture-taking lens for an aerial mapping camera.

In objectives for aerial photographic technology, the surface weighted resolution capability (AWAR), the resolution at the worst picture site, distortion and lateral chromatic aberrations are the main characteristic performance data that are used to describe the optical imaging performance. They must be considered in relation to the technological degree of difficulty of making the lens, to the material used and to the mass and dimensions of the objective. At the present time, there are three picture-taking lenses of comparable quality for aerial mapping cameras:

The universal Aviogon 15/4 UAg (f:4), with an AWAR of 75 L/mm, a resolution of 40 L/mm at the worst picture site and a distortion of ±3 microns measured at the overall length of 372 mm and the maximum lens diameter of about 234 mm. The lens has a 13-lens objective construction with a 3-fold and a 4-fold wring group, and relatively low performance data. This characteristic performance data for the AWAR and the resolution of the worst site of the picture, moreover are not attained for the full opening of $k=4$, but only when the aperture is stopped down to 5.6. As a result the maximum opening is practically not usable if the highest possible resolution is required. For this objective, approximately 550 nm has been selected as the achromatization wavelength. As a result, the lateral chromatic aberration in the short wave region for 480 nm is less than 20 microns. In the longwave range of the spectrum, lateral chromatic aberrations of up to 20 microns occur at 650 nm because of the relatively large secondary spectrum.

The Pleogon A 4/150 has an AWAR of 80 L/mm, a resolution of 67 L/mm at the worst site of the picture and a distortion of ±5 microns. Moreover, it is known that the best examples of this type achieve an AWAR of up to 96 L/mm and a distortion of ±1 micron. For the achromitization of the lateral chromatic aberration, a wavelength of 610 nm was selected. Because of the relatively large secondary spectrum, a lateral chromatic aberration of about 60 microns remains for a wave length of 480 nm and a lateral chromatic aberration of about 5 microns remains for a wave length of 650 nm. Nothing is known of the mass and dimensions of the objective. The material outlay with 9 lenses is relative low. However, the lenses of the objective have an extreme shape, with an center thickness ratio of about 30:1 and extreme deflections. The objective is therefore difficult technologically to produce.

The Lamegon 4.5/150 DM has an AWAR of 90 L/mm, a resolution of 70 L mm at the worst site of the picture and a distortion of ±1 microns. With this objective, however, the lateral chromatic aberration limits the performance in optical representation. For 470 nm, based on the wavelength of 640 nm at which the achromatization lies, it amounts to 30 microns. In the longwave region of the spectrum of 768 nm the lateral chromatic aberration is 30 microns. The relative large secondary spectrum of all known technical solutions does not ensure that the distortion is independent of the spectral sensitivity of the film. In color photographs, it necessarily leads to clearly identifiable color fringes and disadvantageously affects the resolution capability of broad-band sensitized black-and-white films. The AWAR achieved and the resolution capability at the worst site of the picture do not satisfy the highest requirements of photogrammetric recording techniques.

SUMMARY OF THE INVENTION

It is an object of the invention to provide a wide-angle objective as a picture-taking lens for aerial mapping cameras with demanding characteristic performance data and advantageous manufacturing parameters, while avoiding the disadvantages of the state of the art.

The invention is directed to the provision of a high resolution wide-angle lens with a picture angle $2\delta=90°$, a relative aperture of $k=4$ and a focal length of 150 mm, which has an AWAR of 115 L/mm on internationally customary high-resolution aerial photography films a resolution at the worst picture site of 80 L/mm and a residual distortion of less than ±1 micron. The maximum resolution capability is to be attained for a relative aperture of $k=4.5$ and the decrease in performance is to be small for a full aperture. Moreover, the lateral chromatic aberration in the broad-band spectral range of 480 nm to 770 nm in the picture field is to be less than 10 microns and the maximum lens diameter is to be smaller than ⅔ of the picture diagonal and the overall length is not to be larger than the picture diagonal.

Pursuant to the invention, this object is accomplished by providing a wide-angle objective with a high resolution and a low residual distortion, comprised of 11 lenses and 14 glass-air interfaces. 6 lenses are disposed before a center aperture in the direction of the light and centrically to the optical axis, including diverging meniscus lens, a diverging double composite group and a converging composite groups 5 lenses are disposed after the center aperture, including a converging group, a converging double composite group and finally a diverging meniscus lens, one of the lenses after the center aperture being formed of a fluorspar or a fluorspar-like. The converging before the aperture is comprised of composite group a converging lens of high refractive index, a diverging lens and a further converging lens. The converging group after the center aperture includes the converging fluorspar or fluorspar-like lens and a diverging meniscus lens, which are separated from one another by a small thickness of air.

The use of a strongly converging lens of extremely low dispersion and high relative partial dispersion such as fluorspar or fluorsparlike glass in the immediate vicinity of the aperture makes is possible to realize, at the same time, a slight secondary spectrum for the longitudinal and lateral chromatic aberrations without interfering zones of the lateral chromatic aberration. The very large refractive index difference between the fluorspar lens and the subsequent meniscus lens in conjunction with very narrow air gap that is present between the two lenses satisfies the prerequisite of very good correction of the apertural error for the large relative aperture. The disadvanatageous effect of the low reflecting flurospar lens on the coma is compensated for by the high refracting converging lens of the triple group on the aperture space side.

The lenses selected have a maximum center thickness ratio of 1:10 and are therefore easily produced.

BRIEF DESCRIPTION OF THE DRAWINGS

The invention is explained in greater detail by means of the accompanying the following description of an drawings and of the operation.

In the drawings.

DETAILED DESCRIPTION OF A PREFERRED EMBODIMENT OF THE INVENTION

Figure 1:
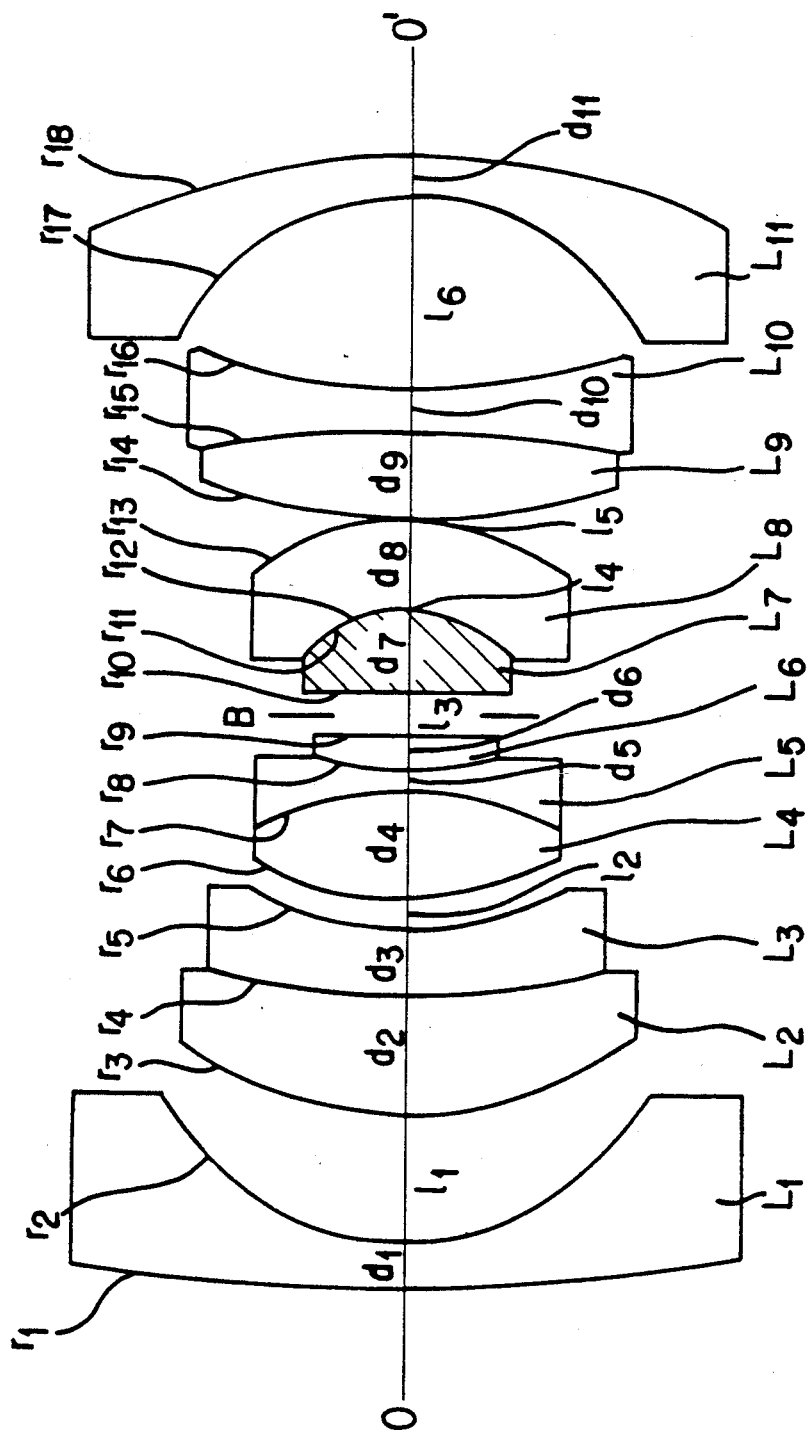
FIG. 1 is a sectional representation of the lenses of an objective in accordance with the invention.

In FIG. 1, lenses L1 to L11 are disposed in the following manner along the optical axis 0—0′ in the direction of the light:

Before a center aperture B, a diverging meniscus lens L1, a diverging double composite group L2, L3 and a converging triple composite group L4, L5, L6 and, after the aperture B a converging group including a converging lens L7 and a diverging menicus lens L8, which are separated by a small thickness of air, and a converging composite group L9, L10 and finally a diverging meniscus lens L11.

The lenses L1 to L11 are labeled by the radii of curvature r1 to r18 of their lens surfaces by numbering them continuously in the direction of the light. The lens thicknesses d1 to d11, measured along the optical axis, and the thicknesses of air 11 to 16 between the axial apexes of the lenses are labeled with the same numbering system.

The refractive indexes of the glasses used are likewise marked in a known manner n1 to n11, and the Abbe numbers are marked V1 to V11, these numbers being related to the e line, that is, to the wavelength of 546.0740 nm.

The following data Table contains the construction data wide-angle objective in accordance with the invention the length data being normalized for a focal length of 1.

Figure 2:
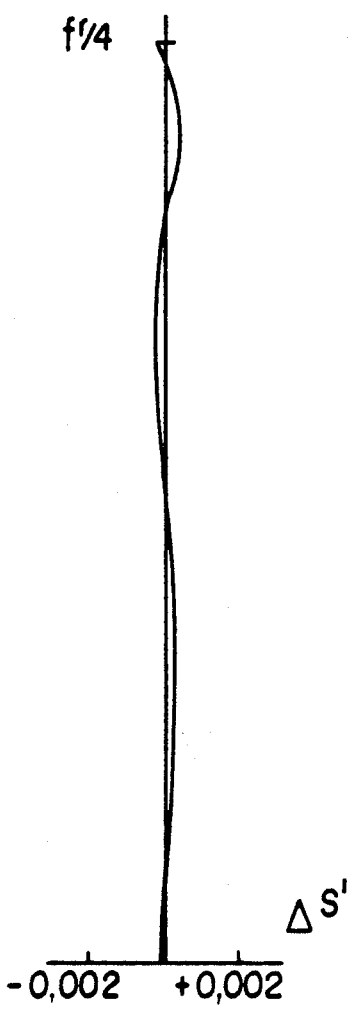
FIG. 2 shows the sperical aberration as a function of the opening and of the distance between the back lens and the image $\Delta s'$.
Figure 3:
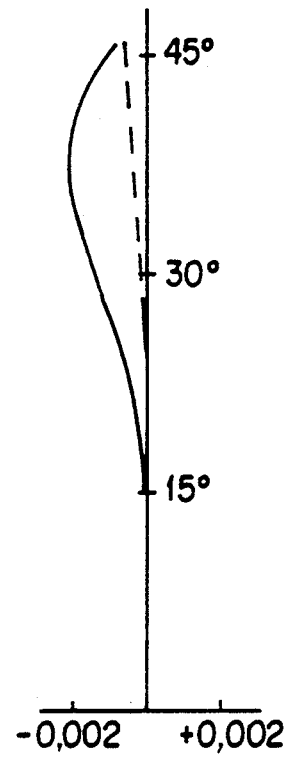
FIG. 3 shows the meridianal (broken line curve) and sagittal (solid line curve) curvature of the image as a function of the angle of the image.
Figure 4:
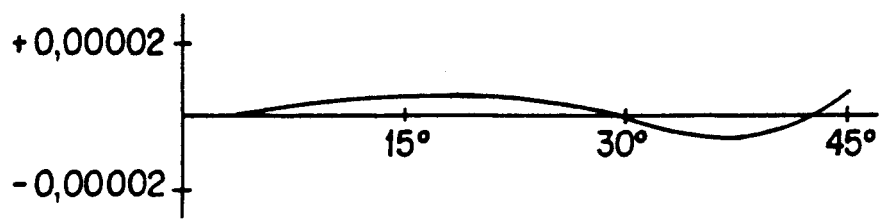
FIG. 4 shows the distortion as a function of the angle of the image.
Figure 5:
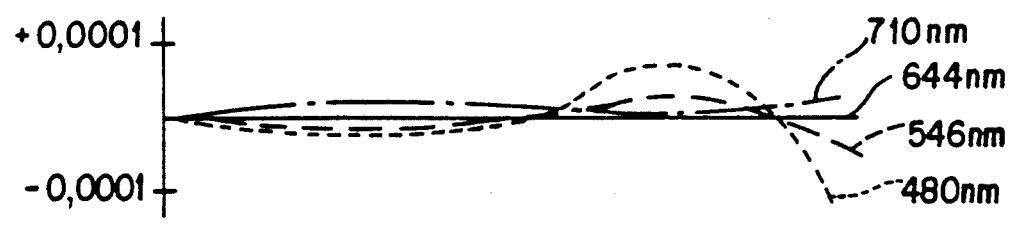
FIG. 5 shows the chromatic distortion, the lateral chromatic aberration, as a function of the angle of the image for 4 different wavelengths.

FIGS. 2 and 3 show the good geometrical and optical correction of the lens that are prerequisite for a good resolution. The distortion of the objective is shown in FIG. 4 and the lateral chromatic aberration of the objective is shown in FIG. 5.

| Lens | Radii | Thickness/ Thickness of Air | Refractive Indexes | Abbe Numbers |
|---|---|---|---|---|
| L1 | r1 = +4.2149 | d 1 = 0.0722 | n 1 = 1.51985 | V 1 = 60.80 |
|  | r2 = +0.4770 |  |  |  |
|  |  | l 1 = 0.2196 |  |  |
|  | r3 = +0.6420 |  |  |  |
| L2 |  | d 2 = 0.2297 | n 2 = 1.70065 | V 2 = 46.67 |
|  | r4 = +1.9039 |  |  |  |
| L3 |  | d 3 = 0.0984 | n 3 = 1.52294 | V 3 = 59.90 |
|  | r5 = +0.7094 |  |  |  |
|  |  | l 2 = 0.0345 |  |  |
|  | r6 = +0.6349 |  |  |  |
| L4 |  | d 4 = 0.1967 | n 4 = 1.69649 | V 4 = 53.29 |
|  | r7 = −0.6241 |  |  |  |
| L5 |  | d 5 = 0.0394 | n 5 = 1.55156 | V 5 = 45.13 |
|  | r8 = +0.7164 |  |  |  |
| L6 |  | d 6 = 0.0623 | n 6 = 1.69649 | V 6 = 53.29 |
|  | r9 = +1.6418 |  |  |  |
|  |  | l 3 = 0.0842 |  |  |
|  | r10 = −6.4468 |  |  |  |
| L7 |  | d 7 = 0.1280 | n 7 = 1.43495 | V 7 = 94.74 |
|  | r11 = −0.2319 |  |  |  |
|  |  | l 4 = 0.0017 |  |  |
|  | r12 = −0.2333 |  |  |  |
| L8 |  | d 8 = 0.1588 | n 8 = 1.73430 | V 8 = 28.12 |
|  | r13 = −0.4537 |  |  |  |
|  |  | l 5 = 0.0013 |  |  |
|  | r14 = +1.4434 |  |  |  |
| L9 |  | d 9 = 0.1645 | n 9 = 1.72794 | V 9 = 37.73 |
|  | r15 = −3.0995 |  |  |  |
| L10 |  | d 10 = 0.0722 | n 10 = 1.57126 | V 10 = 55.73 |
|  | r16 = +1.3011 |  |  |  |
|  |  | l 6 = 0.3330 |  |  |
|  | r17 = −0.4671 |  |  |  |
| L11 |  | d 11 = 0.0722 | n 11 = 1.51859 | V 11 = 63.86 |
|  | r18 = −1.2586 |  |  |  |

We claim:

1. A wide-angle objective with a high resolution and low residual distortion, comprising 11 lenses and 14 glass-air interfaces, wherein, in the direction of light and centrically to the optical axis, 6 lenses are positioned before a center aperture, including a diverging meniscus lens, a converging double composite group and a first converging composite group, in that order, and 5 lenses are positioned after the center aperture, including a second converging group, a converging double composite group and finally a diverging meniscus lens, in that order, said first converging composite group comprising a converging lens of high refractive index, a diverging lens and a further converging lens, the second converging group, after the center aperture including a converging lens consisting of fluorspar or of a material of optical properties like those of flurospar and a diverging meniscus lens separated from one another by a small air gap.

* * * * *